(12) United States Patent
Lopez et al.

(10) Patent No.: US 8,287,423 B2
(45) Date of Patent: Oct. 16, 2012

(54) PLANETARY GEAR SYSTEM

(75) Inventors: Fulton Jose Lopez, Clifton Park, NY (US); Darren Lee Hallman, Scotia, NY (US); Bugra Han Ertas, Niskayuna, NY (US); Robert Michael Zirin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/210,740

(22) Filed: Aug. 16, 2011

(65) Prior Publication Data

US 2012/0027596 A1 Feb. 2, 2012

(51) Int. Cl.
*F16H 57/08* (2006.01)
(52) U.S. Cl. ..................... 475/347; 475/348
(58) Field of Classification Search .......... 475/348
See application file for complete search history.

(56) References Cited

U.S. PATENT DOCUMENTS

| | | | |
|---|---|---|---|
| 5,098,359 A | 3/1992 | Chales et al. | |
| 5,558,593 A | 9/1996 | Röder et al. | |
| 5,679,089 A | 10/1997 | Levedahl | |
| 5,700,218 A | 12/1997 | VanSelous et al. | |
| 6,368,221 B1 | 4/2002 | Sudau | |
| 6,770,007 B2 | 8/2004 | Fox | |
| 6,994,651 B2 | 2/2006 | Fox et al. | |
| 7,056,259 B2 | 6/2006 | Fox | |
| 7,297,086 B2 | 11/2007 | Fox | |
| 7,537,537 B2 | 5/2009 | Smet et al. | |
| 2003/0073537 A1 | 4/2003 | Lloyd | |
| 2003/0099417 A1* | 5/2003 | Bauer et al. | 384/535 |
| 2008/0153657 A1* | 6/2008 | Smook et al. | 475/331 |
| 2008/0194378 A1 | 8/2008 | Fox | |
| 2008/0269007 A1 | 10/2008 | Cunliffe et al. | |
| 2009/0163316 A1 | 6/2009 | Saenz De Ugarte et al. | |
| 2009/0170655 A1 | 7/2009 | Seanz De Ugarte et al. | |
| 2010/0197445 A1 | 8/2010 | Montestruc | |
| 2010/0303626 A1 | 12/2010 | Mostafi | |

\* cited by examiner

*Primary Examiner* — Edwin A Young
(74) *Attorney, Agent, or Firm* — Dority & Manning, P.A.

(57) ABSTRACT

A planetary gear system is disclosed. The planetary gear system includes a carrier, a planet gear defining a central planet axis, and a pin coupling the planet gear to the carrier. The planetary gear system additionally includes a bearing disposed between the planet gear and the pin. The bearing includes a plurality of rolling elements. Each of the rolling elements is in contact with an inner race and an outer race. The planetary gear system further includes a resilient member. The resilient member is disposed between one of the inner race and the pin or the outer race and the planet gear.

19 Claims, 4 Drawing Sheets

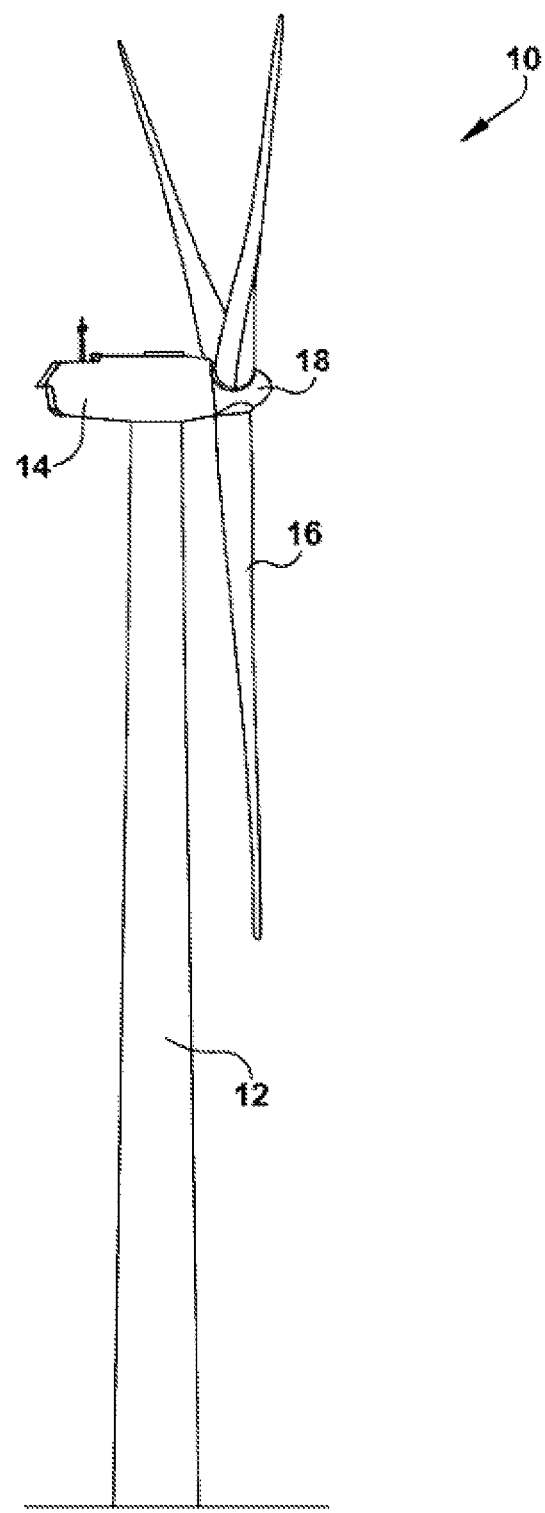
FIG. -1-

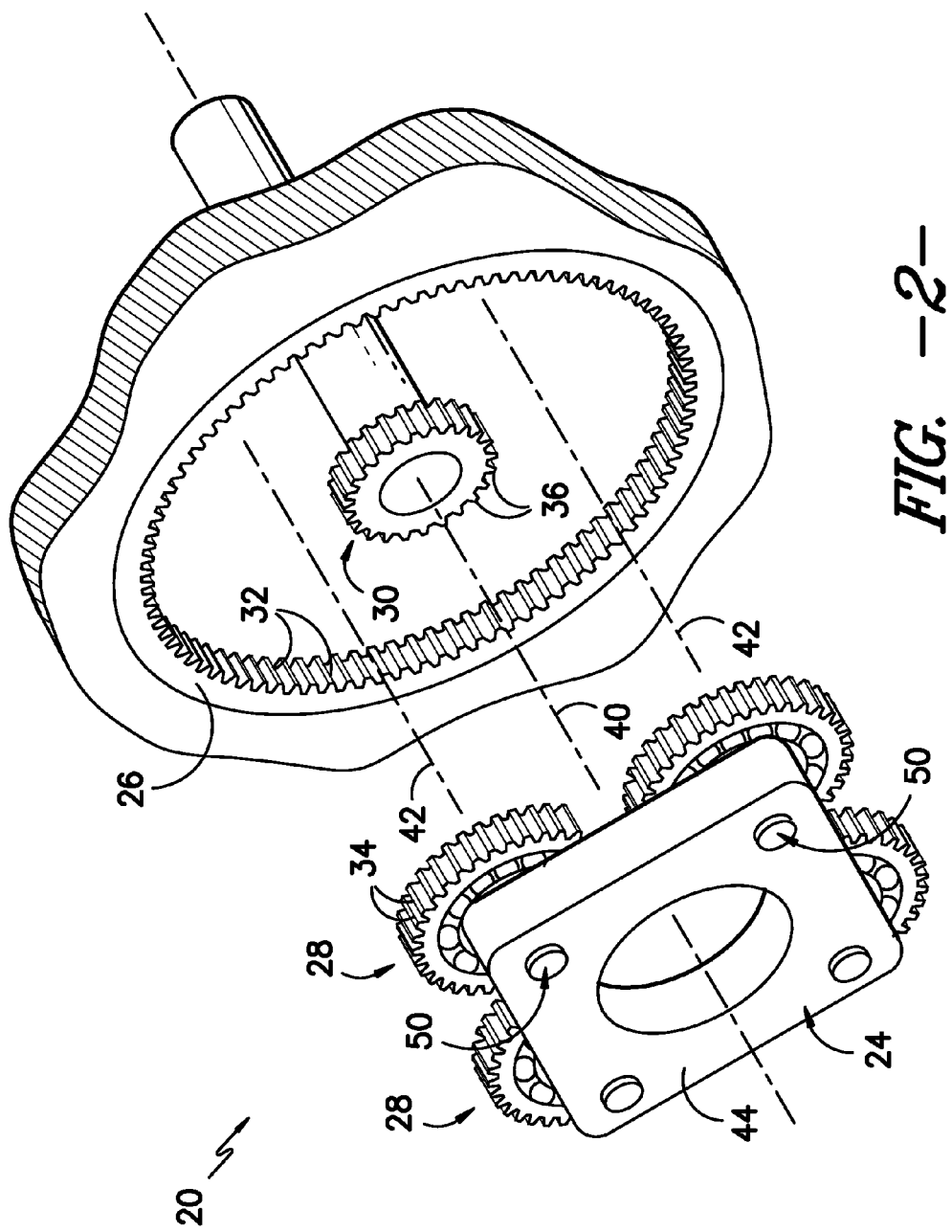
FIG. -2-

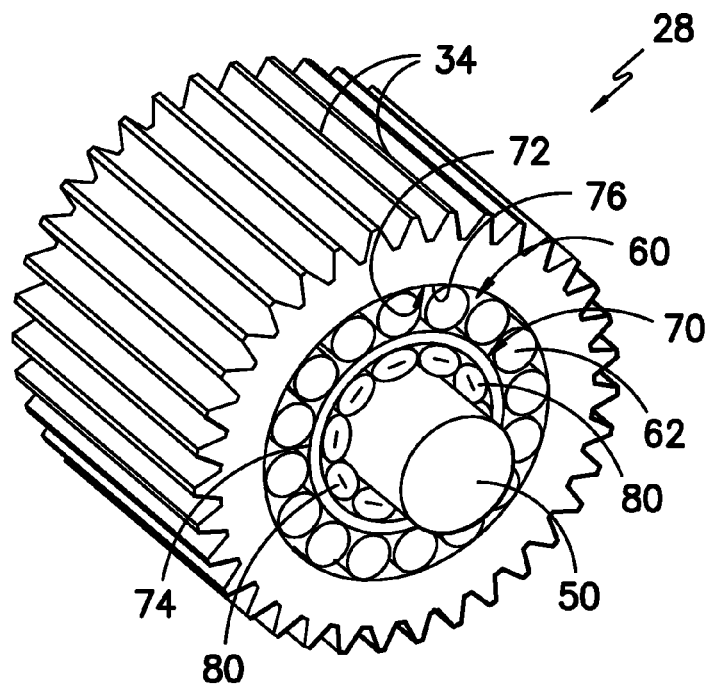
FIG. -3-
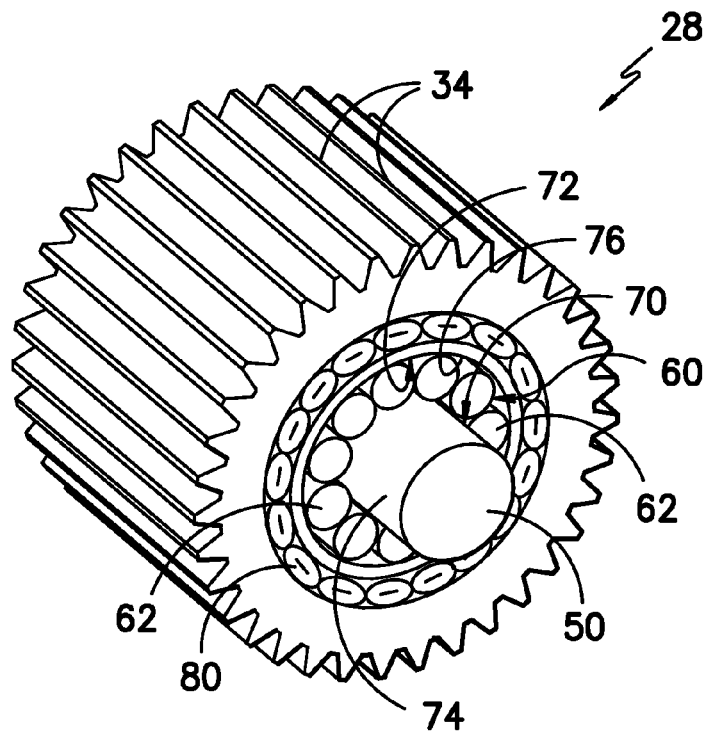
FIG. -4-

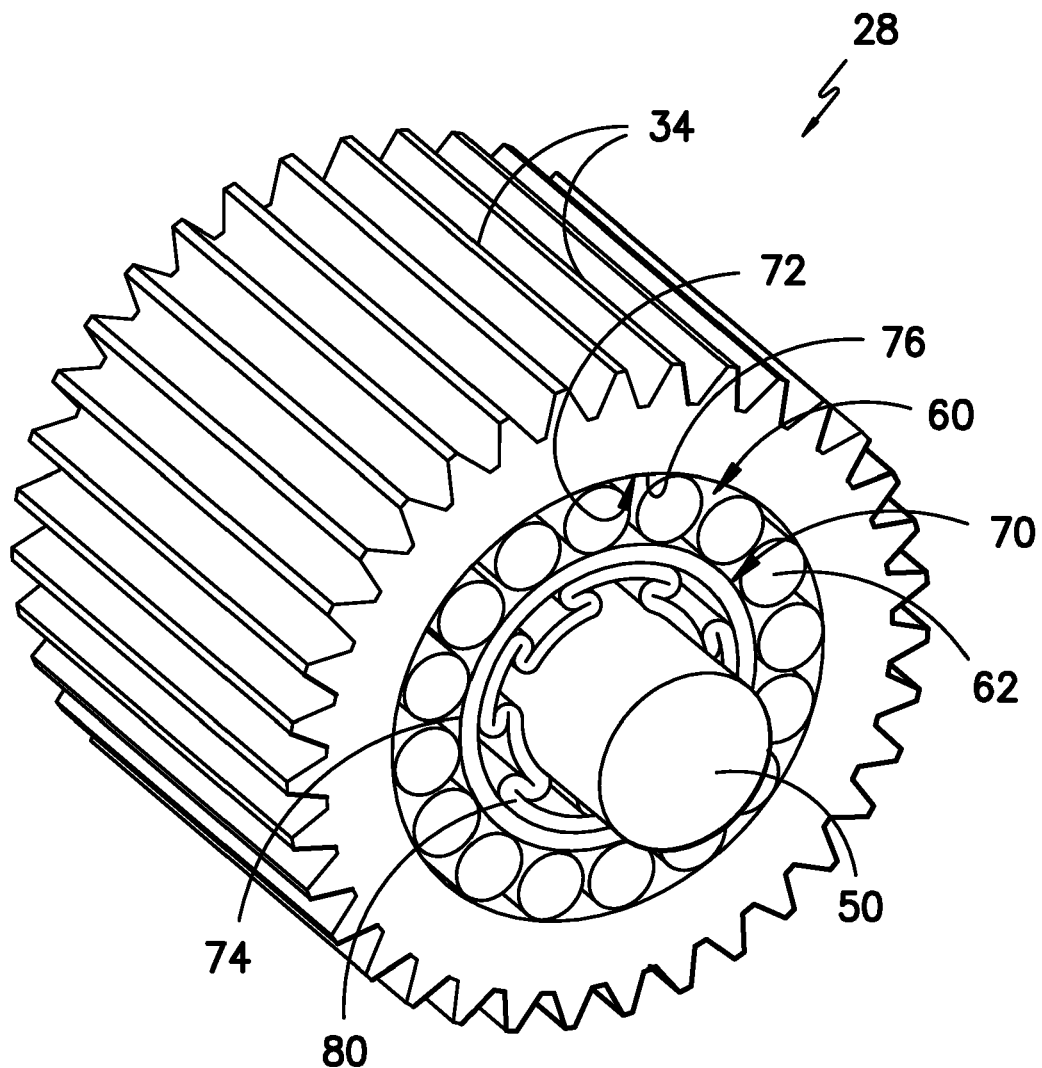
FIG. -5-

PLANETARY GEAR SYSTEM

FIELD OF THE INVENTION

The present disclosure relates in general to planetary gear systems, and more particularly to improved load distribution features in planetary gear systems.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gear system, or if a gear system is not used, directly to the generator. The generator then converts the mechanical energy to electrical energy that may be deployed to a utility grid.

Proper alignment of the meshing teeth of adjacent gears in a gear system, and in particular a planetary gear system, is important for the proper distribution of loads. However, in many current gear systems, various design and operational factors prevent proper alignment of the meshing teeth. For example, manufacturing and design tolerances for the various gears, which typically have involute gear profiles with involute gear teeth, can cause misalignment between the meshing teeth of the adjacent gears. Further, and in particular for gear systems in wind turbines, various components of the gear system such as the carrier experience twisting and/or bending during operation. This twisting and bending is typically caused by loading of an input shaft of the gear system and twisting and bending thereof. Twisting and bending can cause additional misalignment between the meshing teeth of the adjacent gears in the gear system.

Misalignments between adjacent gears in a gear system can have potentially catastrophic results for the gear system and, in wind turbine settings, for the wind turbine itself. For example, misalignments can cause the loads experienced by various gears in the gear system to increase by two or more times the designed loading limits. Thus, the gears that experience this increased loading can become damaged or fail during operation of the gear system, potentially resulting in failure of the gear system.

Thus, an improved gear system, such as an improved planetary gear system, would be desired in the art. For example, a gear system with improved load distribution features would be advantageous.

BRIEF DESCRIPTION OF THE INVENTION

Aspects and advantages of the invention will be set forth in part in the following description, or may be obvious from the description, or may be learned through practice of the invention.

In one embodiment, a planetary gear system is disclosed. The planetary gear system includes a carrier, a planet gear defining a central planet axis, and a pin coupling the planet gear to the carrier. The planetary gear system additionally includes a bearing disposed between the planet gear and the pin. The bearing includes a plurality of rolling elements. Each of the rolling elements is in contact with an inner race and an outer race. The planetary gear system further includes a resilient member. The resilient member is disposed between one of the inner race and the pin or the outer race and the planet gear.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is an exploded perspective view of a planetary gear system according to one embodiment of the present disclosure;

FIG. 3 is a perspective view of a planet gear having resilient members disposed therein according to one embodiment of the present disclosure;

FIG. 4 is a perspective view of a planet gear having resilient members disposed therein according to another embodiment of the present disclosure; and, FIG. 5 is a perspective view of a planet gear having resilient members disposed therein according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 illustrates one embodiment of a planetary gear system 20 according to the present disclosure. The system 20 may, for example, be housed in the nacelle 14. An input shaft (not shown) may provide an input load to the system 20. In embodiments wherein the system 20 is included in a wind turbine 10, the system 20 may provide an output load to a generator (not shown), as is generally known in the art. Thus, during operation, input load at an input rotational speed is transmitted through the planetary gear system 20 and provided as output load at output rotational speed to the generator.

During operation, the input shaft may be subjected to a variety of loads. For example, the input shaft may experience bending loads during operation. The planetary gear system 20 of the present disclosure, as discussed below, advantageously includes improved load distribution features. These load distribution features may reduce or prevent the various components of the planetary gear system from experiencing increased loading due to misalignment caused by transmission of the bending loads or other loads thereto. Additionally, these load distribution features may reduce or prevent the various components of the planetary gear system from experiencing increased loading due to misalignment caused by manufacturing and design tolerances. By reducing or preventing such increased loading of the various components of the system 20, such as the various gears, the improved load distribution features may increase the life of the system 20 and, in some embodiments, a wind turbine 10 in which the system 20 is incorporated.

In exemplary embodiments, the planetary gear system 20 is a single stage planetary gear system 20. Thus, the input rotational speed may be converted to the output rotational speed through a single stage of various mating gears, as discussed below. Alternatively, however, the planetary gear system 20 may be a multiple stage planetary gear system 20, and the input rotational speed may be converted to the output rotational speed through multiple stages of various mating gears.

The planetary gear system 20 includes a carrier 24 and a plurality of gears. For example, the planetary gear system 20 in exemplary embodiments as shown includes a ring gear 26, one or more planet gears 28, and a sun gear 30. The system 20 may include one, two, three, four, five, six, seven, eight, or more planet gears 28. Each of the gears 26, 28, 30 includes a plurality of teeth. For example, the ring gear 26 includes teeth 32, each planet gear 28 includes teeth 34, and each sun gear 30 includes teeth 36. The teeth 32, 34, and 36 are sized and shaped to mesh together such that the various gears 26, 28, 30 engage each other. For example, the ring gear 26 and the sun gear 30 may each engage the planet gears 28.

In some embodiments, the carrier 24 may be stationary. In these embodiments, the input shaft may be coupled to the ring gear 26, and input loads on the input shaft may be transmitted through the ring gear 26 to the planet gears 28. Thus, the ring gear 26 may drive the system 20. In other embodiments, the ring gear 26 may be stationary. In these embodiments, the input shaft may be coupled to the carrier 24, and input loads on the input shaft may be transmitted through the carrier 24 to the planet gears 28. Thus, the carrier 24 may drive the system 20. In still further embodiments, any other suitable component, such as a planet gear 28 or sun gear 30, may drive the system 20.

The sun gear 30 in exemplary embodiments defines a central axis 40, and thus rotates about this central axis 40. The ring gear 26 may at least partially surround the sun gear 30, and be positioned along the central axis 40. For example, the ring gear 26 may be aligned with the sun gear 30 along the central axis 40, or may be offset from the sun gear 30 along the axis 40. The ring gear 26 may (if rotatable) thus rotate about the central axis 40.

Each of the planet gears 28 may be disposed between the sun gear 30 and the ring gear 26, and may engage both the sun gear 30 and the ring gear 26. For example, the teeth 32, 34, and 36 may mesh together, as discussed above. Further, each of the planet gears 28 may define a central planet axis 42, as shown. Thus, each planet gear 28 may rotate about its central planet axis 42. Additionally, the planet gears 28 and central planet axes 42 thereof may rotate about the central axis 40.

The carrier 24 may be disposed adjacent the planet gears 28, and may further be positioned along the central axis 40. The carrier 24 may include a first carrier plate 44 and, in some embodiments, a second carrier plate (not shown). In embodiments wherein the carrier 24 includes both a first carrier plate 44 and a second carrier plate, the planet gears 28 may be disposed therebetween.

Each planet gear 28 according to the present disclosure may be coupled to the carrier 24. For example, a pin 50 may extend through at least a portion of the carrier 24 and planet gear 28 to couple the planet gear 28 and carrier 24 together. The pin 50 may extend and be positioned along the central planet axis 42, such that the planet gear 28 may rotate about the pin 50.

In exemplary embodiments, a pin 50 according to the present disclosure may be fixidly mounted to the carrier 24. For example, the pin 50 may be press-fit into the carrier 24, or may be secured with an adhesive or mechanical fastener, or may be otherwise fixidly mounted thereto. Alternatively, however, a pin 50 may be movably mounted to the carrier 24, such that the pin 50 is rotatable with respect to the carrier 24.

In some embodiments, only one end of the pin 50 is supported. For example, one end of the pin 50 may extend through and thus be supported by the first carrier plate 44, while the other end does not extend through and is not supported by the second carrier plate, or vice versa. In alternative embodiments, however, both the ends may be supported, such as by first carrier plate 44 and second carrier plate.

A bearing 60 may be disposed between each planet gear 28 and associated pin 50. The bearing 60 may allow the planet gear 28 to rotate with respect to the pin 50. Each bearing 60 may include a plurality rolling elements 62, which may be arranged in one or more annular arrays about the pin 50. Further, each of the rolling elements 62 may contact an inner race 70 and an outer race 72. For example, the inner race 70 includes an outer surface 74, and the outer race 72 includes an inner surface 76. These respective surfaces contact the rolling elements 62 and allow the rolling elements 62 to rotate thereon, thus allowing the planet gear 28 to rotate with respect to the pin 50.

As shown in FIGS. 3 through 5, one or more resilient members 80 may be disposed between a planet gear 28 and pin 50 according to the present disclosure. The resilient members 80 may advantageously provide improved load distribution features to the planetary gear system 20. For example, a resilient member 80 according to the present disclosure allows a planet gear 28 to move radially and tangentially with respect to its associated pin 50 during operation of the system 20. In other words, a resilient member 80 allows a planet gear 28 to move out of alignment with the central planet axis 42 defined by that planet gear 28. Such movement and compliance may allow the various gears of the system 20 to maintain proper alignment with one another during operation despite manufacturing and design tolerances of the various gears and despite loading of the system 20.

Thus, resilient members 80 according to the present disclosure may reduce or prevent the various components, such as planet gears 28, of the planetary gear system 20 from experiencing increased loading due to misalignment caused by transmission of the bending loads or other loads thereto. Additionally, resilient members 80 may reduce or prevent the various components, such as planet gears 28 of the planetary gear system 20 from experiencing increased loading due to misalignment caused by manufacturing and design tolerances. For example, the compliance as discussed herein allows the central planet axes 42 to remain generally parallel during operation despite such loading. Further, resilient members 80 may allow for safety factors against misalignment and/or increased loading to be reduced, thus decreasing the mass as well as the production costs of the various components, such as the planet gears 28, of the planetary gear system 20.

In some embodiments, the resilient members 80 may be disposed between the inner race 70 and the pin 50, as shown in FIGS. 3 and 5. In these embodiments, the bearing 60 may be disposed radially outboard of the resilient members 80. In other embodiments, the resilient members 80 may be disposed between the outer race 72 and the planet gear 28, as shown in FIG. 4. In these embodiments, the bearing 60 may be disposed radially inboard of the resilient members 80.

In some embodiments, the inner race 70 and/or outer race 72 may be integral with other various components. For example, as shown in FIGS. 3 and 5, the outer race 72 may be integral with the planet gear 28, while the inner race 70 is a separate component disposed between the resilient members 80 and bearing 60. Thus, the inner surface 76 may be the inner surface of the planet gear 28. As shown in FIG. 4, the inner race 70 may be integral with the with the pin 50, while the outer race 72 is a separate component disposed between the resilient members 80 and bearing 60. Thus, the outer surface 74 may be the outer surface of the pin 28.

As shown, in exemplary embodiments, a plurality of resilient members 80 may be disposed in one or more annular arrays between a pin 50 and planet gear 28. For example, the resilient members 80 may be disposed in one or more annular arrays about the pin 50, such as about the central planet axis 42. Further, in some embodiments, each of the resilient members 80 may be separate from the others of the resilient members 80 in an annular array, or one or more of the resilient members 80 may be connected to one or more annularly adjacent resilient members 80. FIGS. 3 and 4 illustrate separate resilient members 80 disposed in an annular array, while FIG. 5 illustrates adjacent connected resilient members 80 in an annular array.

The resilient member 80 may in exemplary embodiments be a spring, such as a compression spring. In other embodiments, however, the resilient member 80 may be resilient sheet folded on itself, a resilient ring, or any suitable device or component that provides resilient properties that allow movement of a planet gear 28 with respect to a pin 50 as discussed above.

In some embodiments, as shown in FIGS. 3 and 4, a resilient member 80 has a generally O-shaped cross-sectional profile. In other embodiments, a resilient member 80 may have a S-shaped cross-sectional profile, as shown in FIG. 5, or a Z-shaped cross-sectional profile, or any other suitable cross-sectional profile.

It should further be understood that a resilient member 80 according to the present disclosure may be formed from any suitable materials that may provide resilient properties as discussed above. For example, in some embodiments, a resilient member 80 may be formed from a metal or metal alloy, such as a steel alloy. In other embodiments, a resilient member 80 may be formed from a suitable polymer, such as a suitable thermoplastic or thermoset.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A planetary gear system comprising:
   a carrier;
   a planet gear defining a central planet axis;
   a pin coupling the planet gear to the carrier;
   a bearing disposed between the planet gear and the pin, the bearing comprising a plurality of rolling elements, each of the rolling elements in contact with an inner race and an outer race; and,
   a plurality of resilient members disposed between one of the inner race and the pin or the outer race and the planet gear, each of the plurality of resilient members having a generally O-shaped cross-sectional profile in a plane perpendicular to the central planet axis.

2. The planetary gear system of claim 1, wherein each of the plurality of resilient members is connected to an annularly adjacent one of the plurality of resilient members.

3. The planetary gear system of claim 1, wherein each of the plurality of resilient members is a spring.

4. The planetary gear system of claim 1, wherein each of the plurality of resilient members is disposed between the inner race and the pin.

5. The planetary gear system of claim 1, wherein each of the plurality of resilient members is disposed between the outer race and the planet gear.

6. The planetary gear system of claim 1, wherein the outer race is integral with the planet gear.

7. The planetary gear system of claim 1, wherein the inner race is integral with the pin.

8. The planetary gear system of claim 1, wherein each of the plurality of resilient members is formed from a metal or metal alloy.

9. The planetary gear system of claim 1, wherein each of the plurality of resilient members is formed from a polymer.

10. A planetary gear system comprising:
    a sun gear defining a central axis;
    a ring gear at least partially surrounding the sun gear and positioned along the central axis;
    a plurality of planet gears, each of the plurality of planet gears disposed between and engaging the sun gear and the ring gear;
    a carrier disposed adjacent the plurality of planet gears;
    a plurality of pins, each of the pins coupling one of the plurality of planet gears to the carrier;
    a plurality of bearings, each of the plurality of bearings disposed between one of the plurality of planet gears and one of the plurality of pins, the bearing comprising a plurality of rolling elements, each of the rolling elements in contact with an inner race and an outer race; and,
    a plurality of resilient members, each of the plurality of resilient members disposed between one of the inner race and one of the plurality of pins or the outer race and one of the plurality of planet gears, each of the plurality of resilient members having one of a generally O-shaped or generally S-shaped cross-sectional profile in a plane perpendicular to the central planet axis.

11. The planetary gear system of claim 10, wherein each of the plurality of resilient members is disposed between the inner race and the pin.

12. The planetary gear system of claim 10, wherein each of the plurality of resilient members is disposed between the outer race and the planet gear.

13. The planetary gear system of claim 10, wherein the outer race is integral with the planet gear.

14. The planetary gear system of claim 10, wherein the inner race is integral with the pin.

15. A planetary gear system comprising:
   a carrier;
   a planet gear defining a central planet axis;
   a pin coupling the planet gear to the carrier;
   a bearing disposed between the planet gear and the pin, the bearing comprising a plurality of rolling elements, each of the rolling elements in contact with an inner race and an outer race; and,
   a resilient member disposed between one of the inner race and the pin or the outer race and the planet gear, the resilient member having a generally S-shaped cross-sectional profile in a plane perpendicular to the central planet axis.

16. The planetary gear system of claim 15, wherein the resilient member is disposed between the inner race and the pin.

17. The planetary gear system of claim 15, wherein the outer race is integral with the planet gear.

18. The planetary gear system of claim 15, further comprising a plurality of resilient members disposed in an annular array about the central planet axis.

19. The planetary gear system of claim 18, wherein each of the plurality of resilient members is connected to an annularly adjacent one of the plurality of resilient members.

* * * * *